(12) United States Patent
Coons

(10) Patent No.: US 9,471,764 B2
(45) Date of Patent: Oct. 18, 2016

(54) ELECTRONIC DEVICE SWITCHABLE TO A USER-INTERFACE UNLOCKED MODE BASED UPON SPOOF DETECTION AND RELATED METHODS

(75) Inventor: David D. Coons, Satellite Beach, FL (US)

(73) Assignee: APPLE INC., Cupertino, CA (US)

( * ) Notice: Subject to any disclaimer, the term of this patent is extended or adjusted under 35 U.S.C. 154(b) by 514 days.

(21) Appl. No.: 13/553,212

(22) Filed: Jul. 19, 2012

(65) Prior Publication Data

US 2014/0026208 A1    Jan. 23, 2014

(51) Int. Cl.
| G06F 21/00 | (2013.01) |
| H04B 1/38 | (2015.01) |
| G06F 21/32 | (2013.01) |
| G06K 9/00 | (2006.01) |

(52) U.S. Cl.
CPC ........... *G06F 21/32* (2013.01); *G06K 9/00107* (2013.01)

(58) Field of Classification Search
CPC ..................... G06K 9/00107; G06K 9/00006; G06K 9/0002; G06K 9/00026; G06K 9/0004
USPC .......... 726/1–5, 16, 26–30; 716/4, 16, 17, 27
See application file for complete search history.

(56) References Cited

U.S. PATENT DOCUMENTS

| 5,940,526 | A | 8/1999 | Setlak et al. |
| 5,953,441 | A | 9/1999 | Setlak |
| 6,148,094 | A | 11/2000 | Kinsella |
| 6,289,114 | B1 | 9/2001 | Mainguet |
| 6,927,581 | B2 | 8/2005 | Gozzini |
| 7,082,214 | B2 | 7/2006 | Nakano et al. |
| 7,361,919 | B2 | 4/2008 | Setlak |
| 7,697,281 | B2 | 4/2010 | Dabov et al. |
| 7,697,729 | B2 | 4/2010 | Howell et al. |
| 7,715,593 | B1 | 5/2010 | Adams et al. |
| 7,734,068 | B2 | 6/2010 | Fisher |
| 7,941,760 | B2 | 5/2011 | Kocienda et al. |

(Continued)

FOREIGN PATENT DOCUMENTS

JP    61221883    10/1986

OTHER PUBLICATIONS

A Multispectral Whole-Hand Biometric Authentication System, Rowe et al, IEEE 2007.*

(Continued)

*Primary Examiner* — Luu Pham
*Assistant Examiner* — Jahangir Kabir
(74) *Attorney, Agent, or Firm* — Allen, Dyer, Doppelt, Milbrath & Gilchrist, P.A.

(57) ABSTRACT

An electronic device may include a finger biometric sensor and a processor being switchable between a user-interface locked mode and a user-interface unlocked mode. The processor may cooperate with the finger biometric sensor to acquire spoof detection data based upon an object being placed adjacent the finger biometric sensor, and determine whether the acquired spoof detection data is representative of a live finger. The processor may also switch from the user-interface locked mode to the user-interface unlocked mode when the acquired spoof detection data is representative of a live finger, and cooperate with the finger biometric sensor to acquire biometric matching data. The processor may further perform finger matching based upon the acquired biometric matching data and stored biometric enrollment data.

21 Claims, 5 Drawing Sheets

(56) References Cited

U.S. PATENT DOCUMENTS

| | | |
|---|---|---|
| 8,006,099 B2 | 8/2011 | Aoyama et al. |
| 8,046,721 B2 | 10/2011 | Chaudhri et al. |
| 8,079,024 B2 | 12/2011 | White |
| 8,145,916 B2 | 3/2012 | Boshra et al. |
| 8,180,118 B2 | 5/2012 | Neil et al. |
| 8,180,120 B2 | 5/2012 | Hook |
| 9,342,729 B2 * | 5/2016 | Kim .................. G06K 9/00046 |
| 2003/0202687 A1 | 10/2003 | Hamid et al. |
| 2004/0131237 A1 * | 7/2004 | Machida ............ G06K 9/00899 382/124 |
| 2005/0281441 A1 | 12/2005 | Martinsen et al. |
| 2007/0014443 A1 * | 1/2007 | Russo ................ G06K 9/00906 382/124 |
| 2007/0211926 A1 * | 9/2007 | Shinzaki ............ G06K 9/00906 382/124 |
| 2007/0290124 A1 * | 12/2007 | Neil et al. .................... 250/221 |
| 2008/0298649 A1 | 12/2008 | Ennis et al. |
| 2009/0083850 A1 | 3/2009 | Fadell et al. |
| 2009/0155456 A1 | 6/2009 | Benkley et al. |
| 2009/0316963 A1 | 12/2009 | Boshra |
| 2010/0082444 A1 | 4/2010 | Lin et al. |
| 2010/0225607 A1 | 9/2010 | Kim |
| 2010/0321158 A1 | 12/2010 | Setlak et al. |
| 2011/0002461 A1 | 1/2011 | Erhart et al. |
| 2011/0175703 A1 | 7/2011 | Benkley, III |
| 2012/0075452 A1 | 3/2012 | Ferren |

OTHER PUBLICATIONS

Spoof finger detection at user login authentication, Shimamura et al, IEEE 2008.*

* cited by examiner

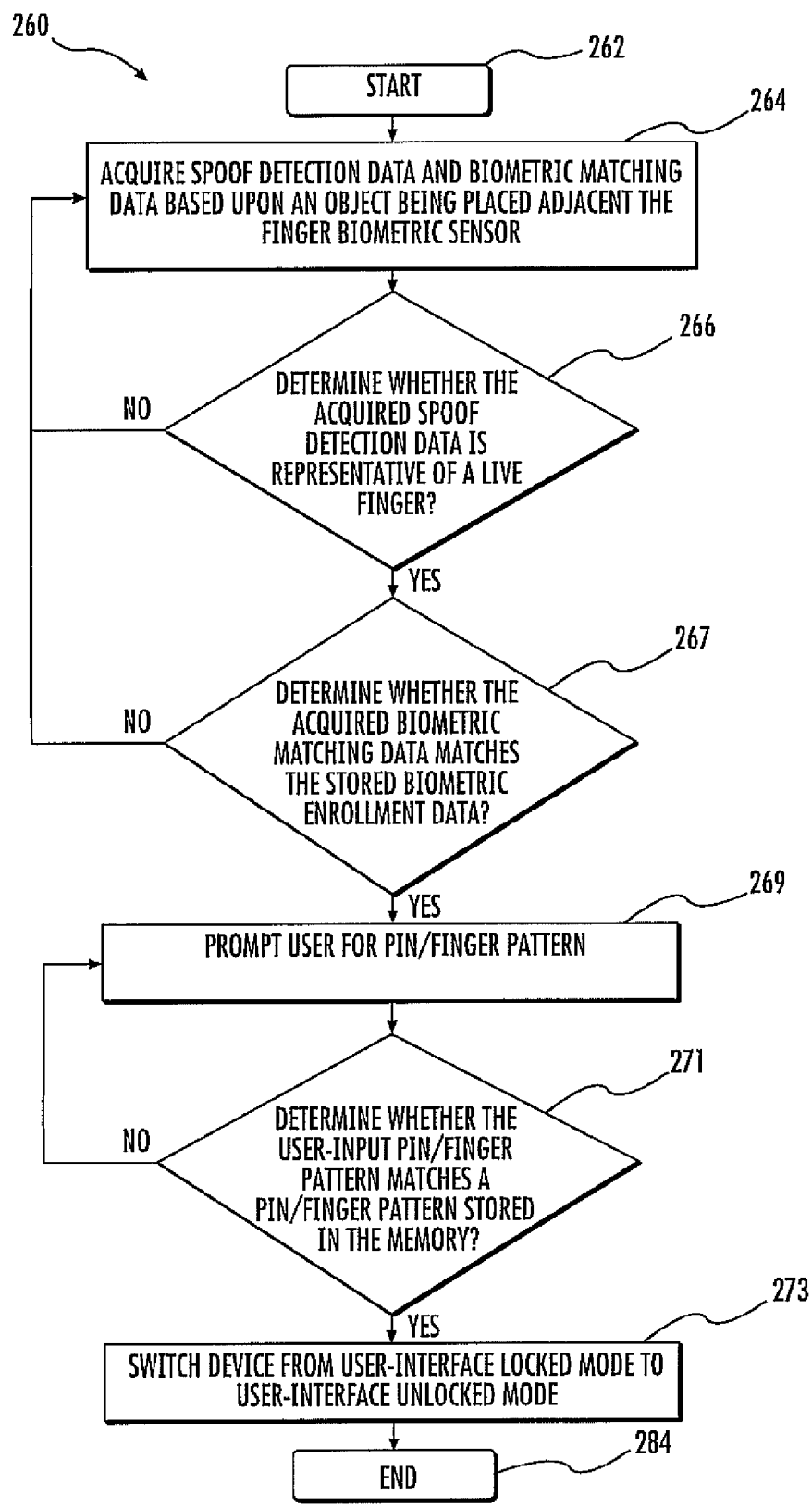

ELECTRONIC DEVICE SWITCHABLE TO A USER-INTERFACE UNLOCKED MODE BASED UPON SPOOF DETECTION AND RELATED METHODS

FIELD OF THE INVENTION

The present invention relates to the field of electronics, and, more particularly, to the field of finger sensors.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention, the entire contents of which are herein incorporated by reference. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet, which is assigned to the assignee of the present invention and is incorporated in its entirety by reference, discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger. For example, the AES3400 sensor from AuthenTec, Inc. of Melbourne, Fla., the assignee of the present invention, is widely used in a variety of notebooks, desktops and PC peripherals. Other fingerprint sensors, for example, the AES850, also from AuthenTec, Inc. of Melbourne, Fla., is a multi-function smart sensor that expands touch-based functionality of touchscreen and QWERTY smartphones with a reduced impact on sensor performance or durability. Thus, a fingerprint sensor may be particularly advantageous for providing more convenient access to the electronic device without a password, for example, and, more particularly, without having to type the password, which is often time consuming.

U.S. Patent Application Publication No. 2011/0175703 to Benkley, III discloses an electronic imager using an impedance sensor grid array mounted on or about a switch. More particularly, Benkley, III discloses a switch being incorporated into a sensor assembly that allows integration of sensor operations, such as, fingerprint sensor operations. A fingerprint sensor can be used for authentication while being used together with a power switch or navigation selection switch. The authentication may be used to access the device entirely or access different levels of information.

U.S. Pat. No. 8,006,099 to Aoyama et al. discloses a portable terminal device, for example, a phone that includes a fingerprint sensor. An authentication unit may cooperate with the fingerprint sensor to unlock the device based upon a fingerprint authentication, a personal identification number (PIN) code, or a combination of a fingerprint authentication and the PIN code.

SUMMARY OF THE INVENTION

In view of the foregoing background, it is therefore an object of the present invention to provide an electronic device having enhanced security and with convenient access.

This and other objects, features, and advantages in accordance with the present invention are provided by an electronic device that may include a finger biometric sensor and a processor being switchable between a user-interface locked mode and a user-interface unlocked mode. The processor may cooperate with the finger biometric sensor to acquire spoof detection data based upon an object being placed adjacent the finger biometric sensor, and determine whether the acquired spoof detection data is representative of a live finger. The processor may also switch from the user-interface locked mode to the user-interface unlocked mode when the acquired spoof detection data is representative of a live finger. The processor may cooperate with the finger biometric sensor to acquire biometric matching data, and perform finger matching based upon the acquired biometric matching data and stored biometric enrollment data. Accordingly, the electronic device advantageously switches to a user-interface unlocked mode based upon acquiring spoof detection data which is typically used along with fingerprint matching. Thus, the device may more quickly switch to the user-interface unlocked mode, for example, compared to switching based upon a full fingerprint matching.

The acquired biometric data may include acquired fingerprint data, for example. The stored biometric enrollment data may include stored fingerprint data. In addition, the processor may perform the matching based upon the acquired spoof detection data being representative of a live finger.

The electronic device may include a user input device coupled to the processor. The processor, when in the user-interface unlocked mode, may perform a corresponding device function responsive to the user input device, for example. The user input device may include a finger-operated input device carrying the finger biometric sensor. The processor may further be configured to switch from the user-interface locked mode to the user-interface unlocked mode further based upon operation of the finger-operated input device.

The processor may cooperate with the finger biometric sensor to acquire complex impedance data, and perform the spoof detection based upon acquired complex impedance data. In some embodiments, the processor may alternatively or additionally, cooperate with the finger biometric sensor to acquire light polarization data, and perform the spoof detection based upon acquired light polarization data. In other embodiments, the processor may alternatively or additionally cooperate with the finger biometric sensor to acquire spatial alignment data, and perform the spoof detection based upon acquired spatial alignment data.

The finger biometric sensor may be responsive to at least one of static contact and sliding contact, for example. The electronic device may further include a wireless transceiver coupled to the processor.

A method aspect is directed to a method of switching between a user-interface locked mode and a user-interface unlocked mode of an electronic device that may include a finger biometric sensor and a processor coupled thereto. The method may include using the processor to cooperate with the finger biometric sensor to acquire spoof detection data based upon an object being placed adjacent the finger biometric sensor, and determine whether the acquired spoof detection data is representative of a live finger. The processor may also be used to switch from the user-interface locked mode to the user-interface unlocked mode when the acquired spoof detection data is representative of a live finger. The processor may further be used to cooperate with the finger biometric sensor to acquire biometric matching data, and perform finger matching based upon the acquired biometric matching data and stored biometric enrollment data.

BRIEF DESCRIPTION OF THE DRAWINGS

FIG. 5 is flow chart of a method of switching between a user-interface locked mode and a user-interface unlocked mode according to yet another embodiment of the present invention.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
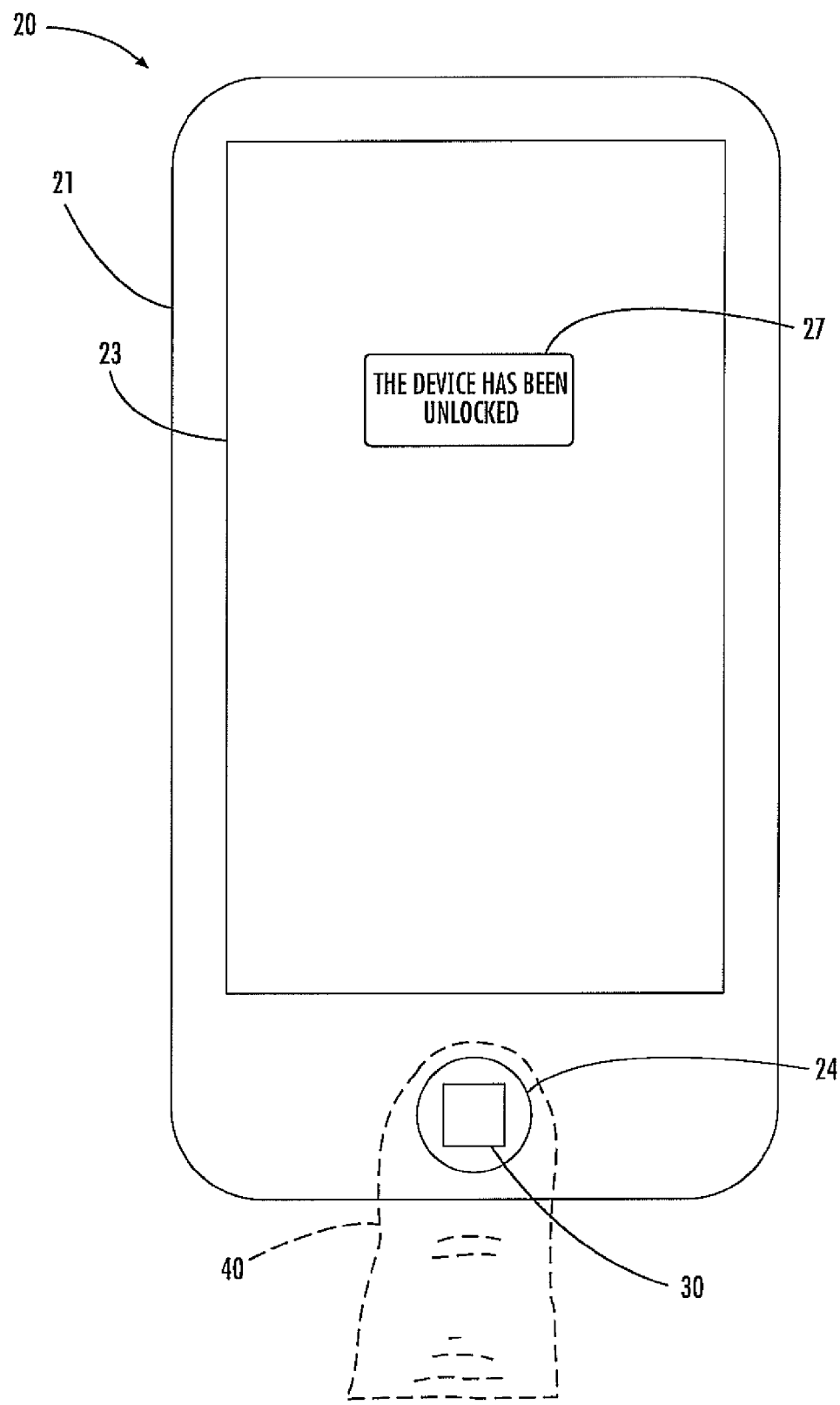
FIG. 1 is a plan view of an electronic device according to the present invention.
Figure 2:
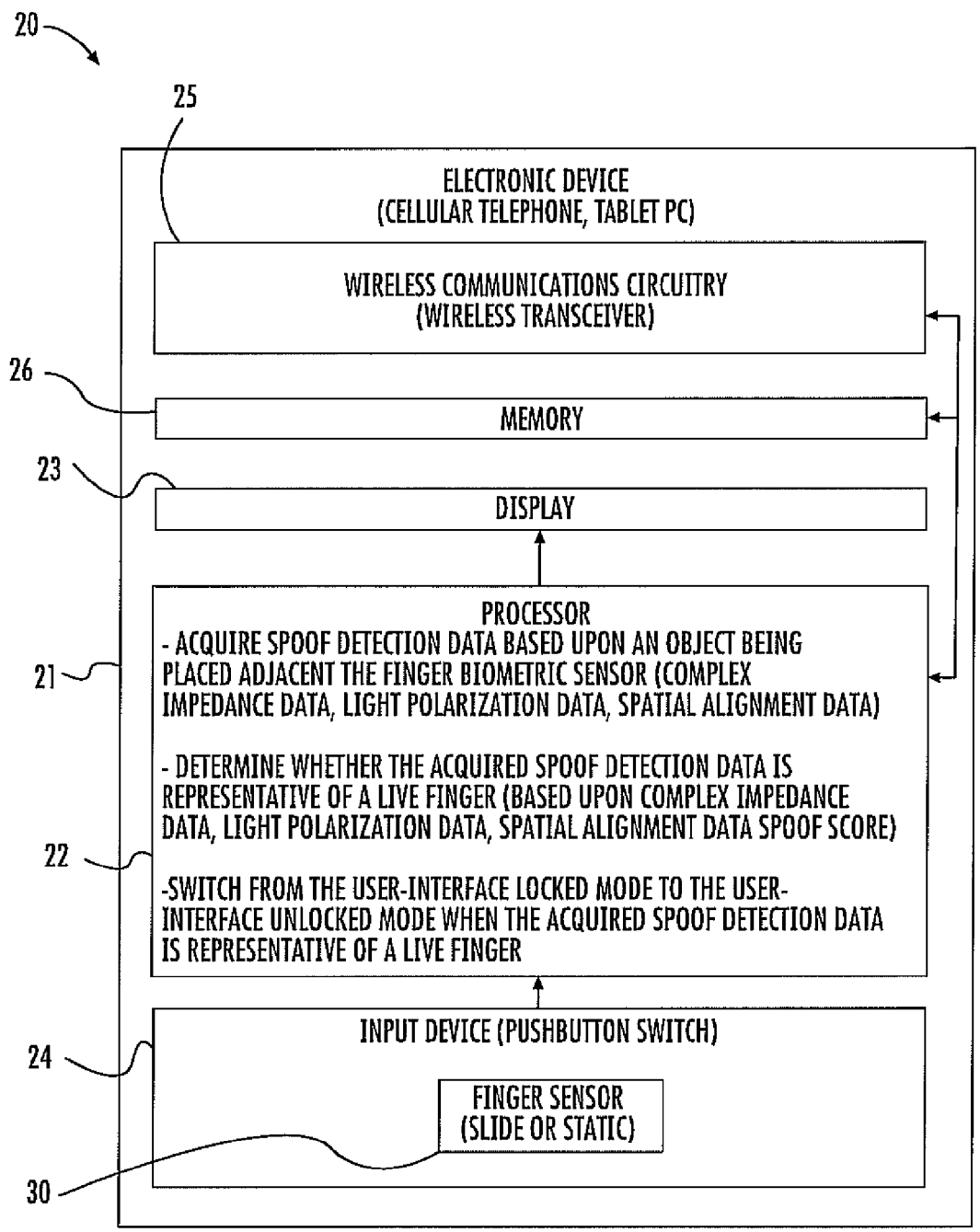
FIG. 2 is a schematic block diagram of the electronic device of FIG. 1.

Referring initially to FIGS. 1 and 2, an electronic device 20 is now described. The electronic device 20 illustratively includes a portable housing 21 and a processor 22 carried by the portable housing. The electronic device 20 is illustratively a mobile wireless communications device, for example, a cellular telephone. The electronic device 20 may be another type of electronic device, for example, a tablet computer, laptop computer, etc.

A wireless transceiver 25 (e.g. cellular, WLAN Bluetooth, etc.) is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25.

A display 23 is also carried by the portable housing 21 and is coupled to the processor 22. The display 23 may be a liquid crystal display (LCD), for example, or may be another type of display, as will be appreciated by those skilled in the art. A memory 26 is also coupled to the processor 22.

A finger-operated user input device 24, illustratively in the form of a pushbutton switch, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device 24 may be a different type of finger-operated user input device, for example, forming part of a touch screen display. Other or additional finger-operated user input devices may be carried by the portable housing 21.

The processor 22 is switchable between a user-interface locked mode and a user-interface unlocked mode. More particularly, in the user-interface locked mode, the processor 22 may restrict corresponding device operations of the pushbutton switch 24 or other user input device. For example, in the user-interface locked mode, operation of the pushbutton switch may turn on the display 23 with a message that the device is locked, while in the user-interface unlocked mode, operation of the pushbutton switch may perform the corresponding device function, for example, a home function, as noted above. Of course, in the user-interface locked mode additional or other user-input devices may be inoperative or may not perform the corresponding function as in the user-interface unlocked mode.

A finger biometric sensor 30 is carried by the pushbutton switch 24 to sense a user's finger 40 or an object placed adjacent the finger biometric sensor. The finger biometric sensor 30 is carried by the pushbutton switch 24 so that when a user contacts and/or presses downward on the pushbutton switch, data from the user's finger 40 is acquired, for example, for finger matching and/or spoof detection, as will described in further detail below. In other words, the finger biometric sensor 30 may be responsive to static contact or placement of the user's finger 40 or object. Of course, in other embodiments, for example, where the finger biometric sensor 30 is not carried by a pushbutton switch, the finger biometric sensor may be a slide sensor and may be responsive to sliding contact, or the finger biometric sensor may be a standalone static placement sensor.

Figure 3:
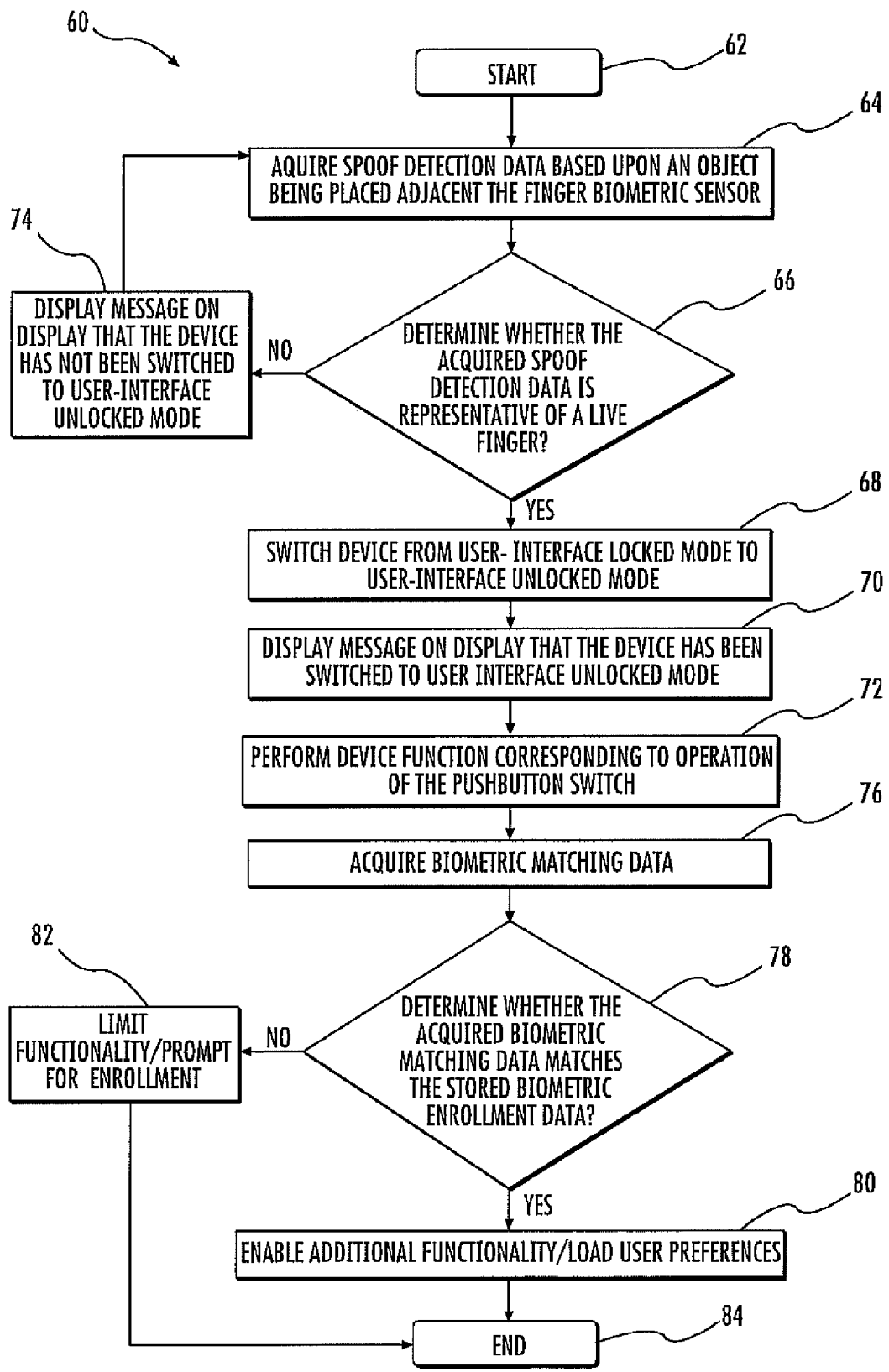
FIG. 3 is a flow chart of a method of switching between a user-interface locked mode and a user-interface unlocked mode according to the present invention.

Referring now additionally to the flowchart 60 in FIG. 3, further details of operation of the electronic device 20 are now described. Beginning at Block 62, the processor 22 cooperates with the finger biometric sensor 30 to acquire spoof detection data based upon an object being placed adjacent the finger biometric sensor (Block 64). The spoof detection data may be acquired via operation of the pushbutton switch 24. However, the corresponding device function may not be performed responsive to the operation of the pushbutton switch 24. In other embodiments, for example, where the finger biometric sensor 30 is a slide sensor, the spoof detection data may be acquired upon sliding contact with the user's finger or object.

At Block 66, the processor 22 determines whether the acquired spoof detection data is representative of a live finger. As will be appreciated by those skilled in the art, a live finger has certain biometric or other characteristics that allow differentiation with a spoof finger, and data representative of these characteristic may be used to determine whether a live finger has in fact been placed adjacent the finger biometric sensor 30, as will be explained in further detail below.

In one example spoof detection technique, the spoof detection data may include complex impedance data. The processor 22 may perform the spoof detection based upon acquired complex impedance data. As will be appreciated by those skilled in the art, a live finger has a complex impedance that can be distinguished from the complex impedance of a spoof finger. Further details of using complex impedance data for spoof detection are disclosed in U.S. Pat. No. 5,940,526 to Setlak, and assigned to the assignee of the present application, and the entire contents of which are herein incorporated by reference.

In another example spoof detection technique, the spoof detection data may include light polarization data. As will be appreciated by those skilled in the art, light reflected from a live finger versus a spoof finger has different properties or characteristics, for example, polarization. The processor 22 may perform the spoof detection based upon acquired light polarization data. Further details of using complex impedance data for spoof detection are disclosed in U.S. Pat. No. 8,180,120 to Hook, and assigned to the assignee of the present application, and the entire contents of which are herein incorporated by reference.

In yet another example spoof detection technique, the spoof detection data may include spatial alignment data. The processor 22 may perform the spoof detection based upon the acquired spatial alignment data. As will be appreciated by those skilled in the art, alignment data may differ from a live finger to a spoof finger, for example, when a finger or spoof finger moves across the biometric finger sensor 30. Further details of using spatial alignment data are described in U.S. Application Publication No. 2009/0316963 to Boshra, and assigned to the assignee of the present application, and the entire contents of which are herein incorporated by reference.

Of course, other or additional spoof detection data may be acquired, and the processor 22 may perform the spoof detection based upon that spoof detection data. Additionally, the processor 22 may perform spoof detection based upon more than one type of spoof detection data and/or corresponding spoof detection technique. Additional spoof techniques are described in U.S. Pat. No. 8,180,118 to Neil et al. and U.S. Pat. No. 8,079,024 to White, both of which are assigned to the assignee of the present application, and both of which are herein incorporated in their entirety by reference.

If the processor 22 determines that the acquired spoof detection data is representative of a live finger (Block 66), the processor switches from the user-interface locked mode to the user-interface unlocked mode (Block 68). In other words, the device 20 is switched to the user-interface unlocked mode where, responsive to a subsequent operation of the pushbutton switch, the corresponding device operation may be performed. In some embodiments, the processor 22 may switch the device 20 to the user-interface unlocked mode and perform the corresponding device function responsive to the same operation of the pushbutton switch 24. By performing only a spoof detecting determination prior to switching to the user-interface unlocked mode, the device may more quickly switch to the user-interface unlocked mode based upon a detected human presence, for example. Thus, the device 20 may also consume less power, for example, as compared to alternatively or additionally switching to the user-interface unlocked mode based upon performing a full match operation.

The processor 22 may display a message 27 on the display 23 that the device 20 has been switched from the user-interface locked mode to the user-interface unlocked mode (Block 70) (FIG. 1). The message 27 may be displayed for threshold time period, for example, a few seconds. Alternatively, the processor 22 may display a "home" screen without any banner or indication that the device 20 is in the user-interface locked mode, for example, when the process performs the device function corresponding to the operation of the pushbutton switch.

In some embodiments, the processor 22 may generate or determine a spoof score based upon the spoof detection data and determine whether the acquired spoof detection data is representative of a live finger based upon the spoof score relative to a threshold. The threshold may be adjusted based upon a desired sensitivity or level of security, as will be appreciated by those skilled in the art.

In the user-interface unlocked mode, the processor 22 performs the corresponding device function responsive to the pushbutton switch 24 (Block 72). For example, the processor 22 may perform a home or menu function based upon operation of the pushbutton switch 24, which would not be performed in the user-interface locked mode.

If, however, the processor 22 determines that the spoof detection data is not representative of a live finger (Block 66), i.e., a spoof, the processor may display a message on the display 23 indicating that the device 20 is in the user-interface locked mode (Block 74). The processor 22 may then again acquire spoof detection data (Block 64) based upon an object being placed adjacent the finger biometric sensor 30, or, more particularly, based upon operation of the pushbutton switch 24.

The processor 22 also cooperates with the finger biometric sensor 30 to acquire biometric matching data (Block 76). The biometric matching data may be acquired based upon a subsequent contact, e.g., sliding or static, of the user's finger 40 or an object adjacent the finger biometric sensor 30.

The acquired biometric matching data may include fingerprint data, and more particularly, fingerprint minutae data, ridge and/or valley fingerprint image data, ridge flow data, finger pore data, etc. For example, the finger biometric sensor 30 may be a finger sensor as described in U.S. Pat. No. 5,953,441 to Setlak and/or as described in U.S. Pat. No. 6,927,581 to Gozzini, and assigned to the assignee of the present invention and the entire contents of which are herein incorporated by reference.

The processor 22, at Block 78, performs finger matching based upon the acquired biometric matching data and stored biometric enrollment data stored in the memory 26 (Block 78). The stored biometric enrollment data may also be fingerprint data, for example, as noted above. As will be appreciated by those skilled in the art, the stored enrollment data may acquired by any enrollment technique. The processor 22 may prompt the user, via the display 23, subsequent to determining the acquired spoof data is representative of a live finger, to place the user's finger adjacent the biometric finger sensor 30 for matching. The processor 22 may, upon a match between the acquired biometric enrollment data and the stored biometric enrollment data, enable additional functionality (Block 80). If the processor 22 does not find a match between the acquired biometric matching data and the stored biometric matching data, the functionality of the device may be limited or not function at all. The processor 22 may also load user preferences corresponding to the user based upon a match of the biometric matching data. Moreover, if, for example, a match is not found between the acquired biometric matching data and the stored biometric matching data, the processor 22 may prompt the user to enroll biometric matching data (Block 82). The method ends at Block 84.

Figure 4:
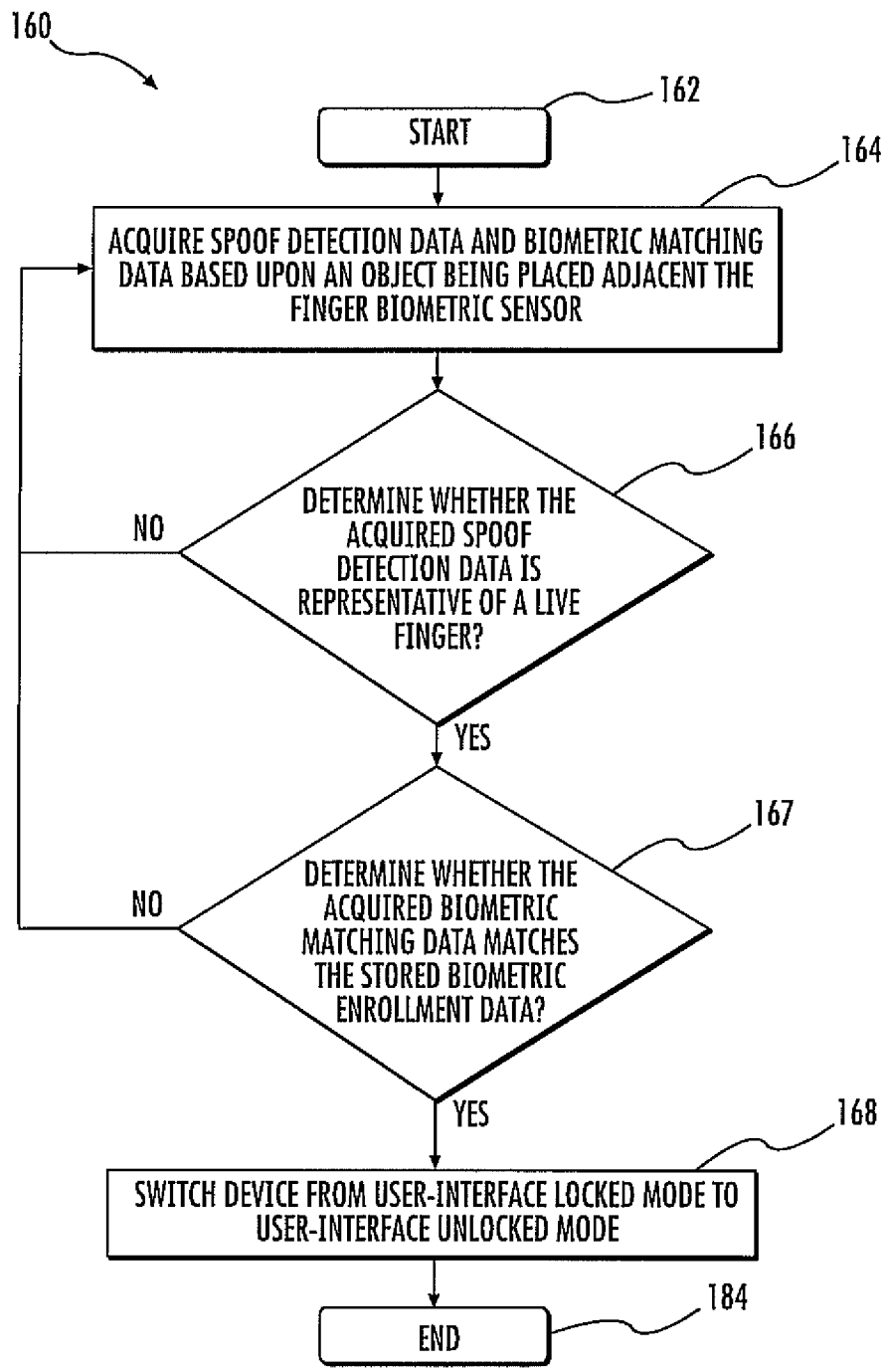
FIG. 4 is a flow chart of a method of switching between a user-interface locked mode and a user-interface unlocked mode according to another embodiment of the present invention.

Referring now to the flowchart 160 in FIG. 4, beginning at Block 162, in another embodiment, the processor 22 acquires the biometric matching data and the spoof detection data (Block 164) based upon a single operation of the pushbutton switch 24. The biometric matching data and the spoof detection data may be acquired at the same time. The processor 22 determines whether the acquired spoof detection data is representative of a live finger (Block 166). The processor 22 also determines whether the acquired biometric matching data matches the stored biometric enrollment data, i.e., performs finger matching (Block 167). Based upon the spoof detection data being representative of a live finger and a match between the stored biometric matching data and the acquired biometric matching data, the processor 22 switches from the user-interface locked mode to the user-interface unlocked mode (Block 168). If the spoof detection data is not representative of a live finger or there is not a match between the stored biometric matching data and the acquired biometric matching data, the processor 22 does not switch to the user-interface unlocked mode. Spoof detection data and biometric matching data are again acquired at Block 164. Of course, the processor 22 may perform other or additional functions, for example, perform the device function corresponding to operation of the pushbutton switch 24. The method ends at Block 184.

Referring now to the flowchart 260 in FIG. 5, in yet another embodiment, beginning at Block 262, the processor 22 acquires the biometric matching data and the spoof detection data (Block 264). The biometric matching data and the spoof detection data may be acquired at the same time. The processor 22 determines whether the acquired spoof detection data is representative of a live finger (Block 266). The processor 22 also determines whether the acquired biometric matching data matches the stored biometric enrollment data, i.e., performs finger matching (Block 267). The processor 22 may, upon determining the acquired spoof detection data is representative of a live finger (Block 266), and after performing the finger matching (Block 267), display on the display 23, a prompt 27 for the user to enter via a user-input device, a personal identification number (PIN), a finger pattern on the display when the display is a touch-sensitive display, or a combination of both (Block 269). The processor 22 determines whether the user-input PIN and/or finger pattern matches a PIN/finger patter stored in the memory 26 (Block 271). If the processor 22 determines there is no match, the processor again prompts the user for the PIN and/or finger pattern. If the user-input PIN and/or finger pattern matches the stored PIN and/or finger pattern, the processor 22 may then switch the device 20 from the user-interface locked mode to the user-interface unlocked mode (Block 273). The method ends at Block 284.

It should be understood that while the embodiments described may be particularly useful for both spoof detecting and matching operations, the matching operation may be performed independently of the spoof detecting operation, and vice versa. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a finger biometric sensor; and
a processor configured to
cooperate with said finger biometric sensor to acquire spoof detection data based upon an object being placed adjacent said finger biometric sensor,
determine whether the acquired spoof detection data is representative of a live finger based upon at least one of complex impedance data, spatial alignment data, and light polarization data,
maintain a user-interface locked mode upon determining that the acquired spoof detection data is representative of a spoof,
switch from the user-interface locked mode to a user-interface unlocked mode upon determining that the acquired spoof detection data is representative of a live finger, the user-interface locked mode permitting limited functionality while the electronic device remains locked,
subsequent to the switching, cooperate with said finger biometric sensor to acquire biometric matching data of a user,
perform finger matching based upon the acquired biometric matching data and stored biometric enrollment data, and
enable at least one additional function of the electronic device upon determining that the biometric matching data of the user matches the stored biometric enrollment data.

2. The electronic device according to claim 1 wherein the acquired biometric data comprises acquired fingerprint data, and wherein the stored biometric enrollment data comprises stored fingerprint data.

3. The electronic device according to claim 1 further comprising a user input device coupled to said processor; and wherein said processor, when in the user-interface unlocked mode, is to perform a corresponding device function responsive to said user input device.

4. The electronic device according to claim 3 wherein said user input device comprises a finger-operated input device carrying said finger biometric sensor.

5. The electronic device according to claim 1 further comprising a finger-operated input device carrying said finger biometric sensor; and wherein said processor is further configured to switch from the user-interface locked mode to the user-interface unlocked mode further based upon operation of said finger-operated input device.

6. The electronic device according to claim 1 wherein said finger biometric sensor is responsive to at least one of static contact and sliding contact.

7. The electronic device according to claim 1 further comprising a wireless transceiver coupled to said processor.

8. An electronic device comprising:
a housing;
a finger biometric sensor carried by said housing;
a wireless transceiver carried by said housing;
a user input device carried by said housing; and
a processor coupled to said wireless transceiver and said user input device, and configured to cooperate with said finger biometric sensor to acquire spoof detection data based upon an object being placed adjacent said finger biometric sensor, determining whether the acquired spoof detection data is representative of a live finger based upon at least one of complex impedance data, spatial alignment data, and light polarization data, maintain a user-interface locked mode upon determining that the acquired spoof detection data is representative of a spoof, switch from the user-interface locked mode to a user-interface unlocked mode upon determining that the acquired spoof detection data is representative of a live finger, the user-interface locked mode permitting limited functionality while the electronic device remains locked, perform a corresponding device function responsive to said user input device when in the user-interface unlocked mode, subsequent to the switching, cooperate with said finger biometric sensor to acquire biometric matching data of a user, perform finger matching based upon the acquired biometric matching data and stored biometric enrollment, and enable at least one additional function of the electronic device upon determining that the biometric matching data of the user matches the stored biometric enrollment data.

9. The electronic device according to claim 8 wherein the acquired biometric data comprises acquired fingerprint data, and wherein the stored biometric enrollment data comprises stored fingerprint data.

10. The electronic device according to claim 8 wherein said user input device comprises a finger-operated input device carrying said finger biometric sensor.

11. The electronic device according to claim 10 wherein said processor is further configured to switch from the user-interface locked mode to the user-interface unlocked mode further based upon operation of said finger-operated input device.

12. A method of switching using an electronic device comprising a finger biometric sensor and a processor coupled thereto, the method comprising:

cooperating, using the processor, with the finger biometric sensor to acquire spoof detection data based upon an object being placed adjacent to the finger biometric sensor;

determining, using the processor, whether the acquired spoof detection data is representative of a live finger based upon at least one of complex impedance data, spatial alignment data, and light polarization data;

maintaining a user-interface locked mode upon determining, using the processor, that the acquired spoof detection data is representative of a spoof;

switching from the user-interface locked mode to a user-interface unlocked mode upon determining, using the processor, that the acquired spoof detection data is representative of a live finger, the user-interface locked mode permitting limited functionality while the electronic device remains locked;

subsequent to the switching, cooperating, using the processor, with the finger biometric sensor to acquire biometric matching data of a user;

performing, using the processor, finger matching based upon the acquired biometric matching data and stored biometric enrollment data; and enabling, using the processor, at least one additional function of the electronic device upon determining that the biometric matching data of the user matches the stored biometric enrollment data.

13. The method according to claim 12 wherein the acquired biometric data comprises acquired fingerprint data, and wherein the stored biometric enrollment data comprises stored fingerprint data.

14. The method according to claim 12 further comprising using the processor, when in the user-interface unlocked mode, to perform a corresponding device function responsive to a user input device.

15. The method according to claim 14 wherein the user input device comprises a finger-operated input device carrying the finger biometric sensor.

16. The method according to claim 12 wherein the processor switches from the user-interface locked mode to the user-interface unlocked mode further based upon operation of a finger-operated input device carrying the finger biometric sensor.

17. A non-transitory computer readable medium for an electronic device comprising a finger biometric sensor and a processor coupled thereto, the non-transitory computer readable medium comprising computer-executable instructions for causing a processor coupled to a finger biometric sensor to perform operations comprising:

cooperating with the finger biometric sensor to acquire spoof detection data based upon an object being placed adjacent to the finger biometric sensor;

determining whether the acquired spoof detection data is representative of a live finger based upon at least one of complex impedance data, spatial alignment data, and light polarization data;

maintaining a user-interface locked mode upon determining, using the processor, that the acquired spoof detection data is representative of a spoof;

switching from the user-interface locked mode to a user-interface unlocked mode upon determining that the acquired spoof detection data is representative of a live finger, the user-interface locked mode permitting limited functionality while the electronic device remains locked;

subsequent to the switching, cooperating with the finger biometric sensor to acquire biometric matching data of a user;

performing finger matching based upon the acquired biometric matching data and stored biometric enrollment data; and enabling at least one additional function of the electronic device upon determining that the biometric matching data of the user matches the stored biometric enrollment data.

18. The non-transitory computer readable medium of claim 17 wherein the acquired biometric data comprises acquired fingerprint data, and wherein the stored biometric enrollment data comprises stored fingerprint data.

19. The non-transitory computer readable medium of claim 17 wherein the computer-executable instructions cause the processor to perform, when in the user-interface unlocked mode, a corresponding device function responsive to a user input device.

20. The non-transitory computer readable medium of claim 19 wherein the user input device comprises a finger-operated input device carrying the finger biometric sensor.

21. The non-transitory computer readable medium of claim 17 wherein the computer-executable instructions cause the processor to switch from the user-interface locked mode to the user-interface unlocked mode further based upon operation of a finger-operated input device carrying the finger biometric sensor.

* * * * *